Aug. 8, 1961     H. J. LEACH ET AL     2,994,948
ARMATURE ASSEMBLY APPARATUS
Filed July 8, 1958     6 Sheets-Sheet 1
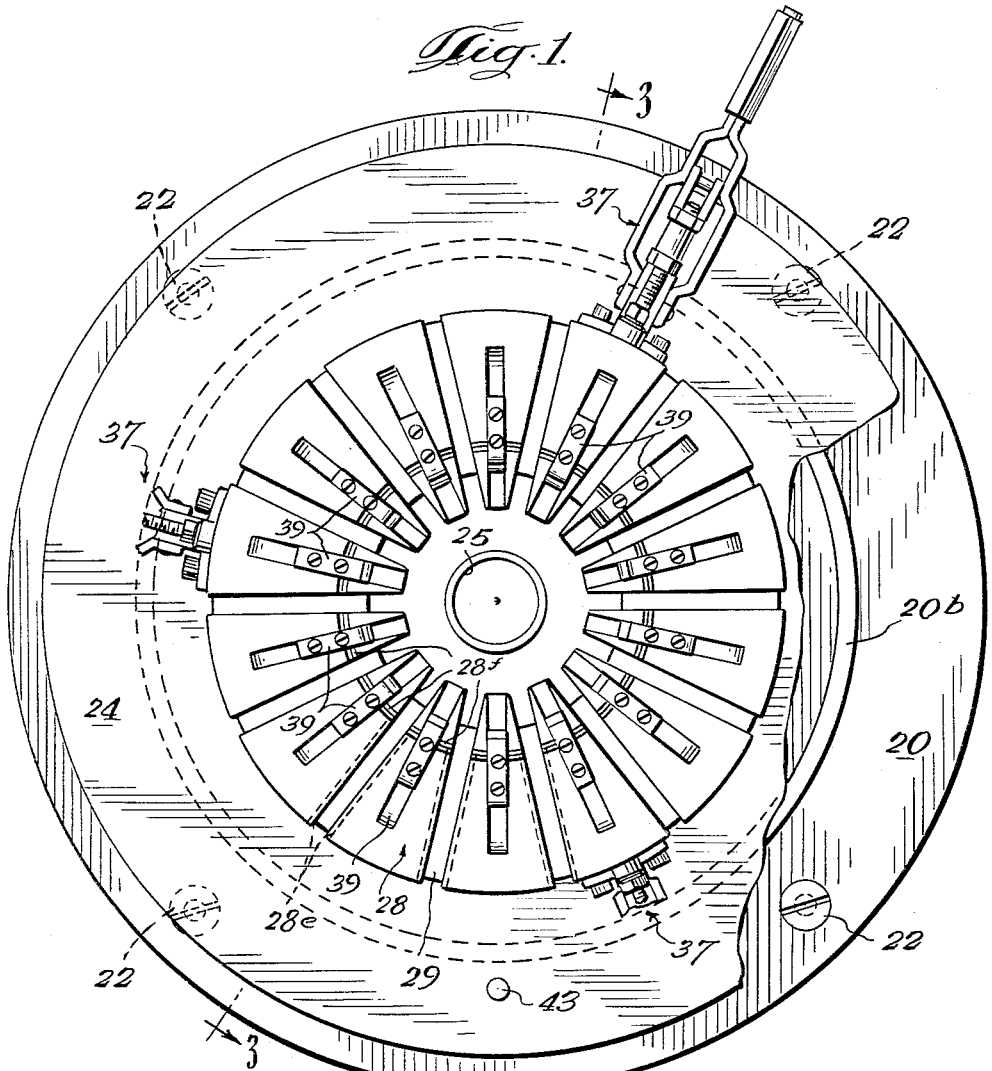
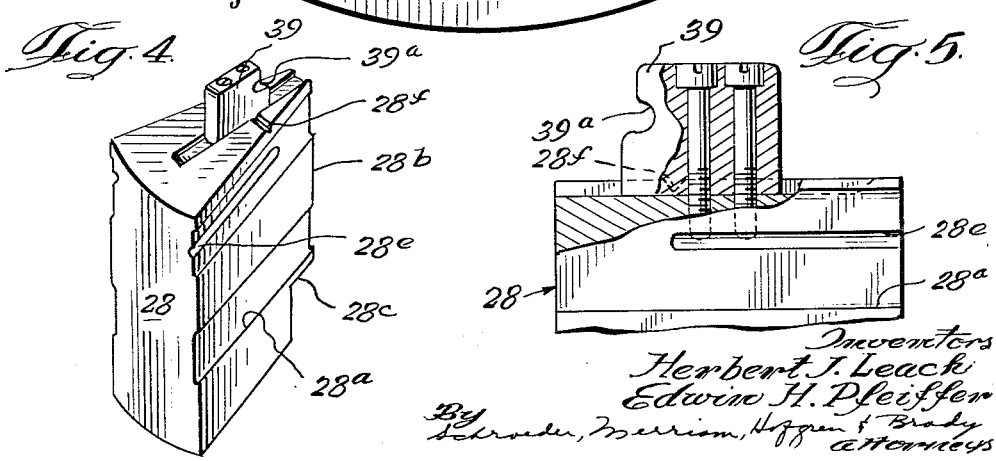

Aug. 8, 1961   H. J. LEACH ET AL   2,994,948
ARMATURE ASSEMBLY APPARATUS
Filed July 8, 1958   6 Sheets-Sheet 2
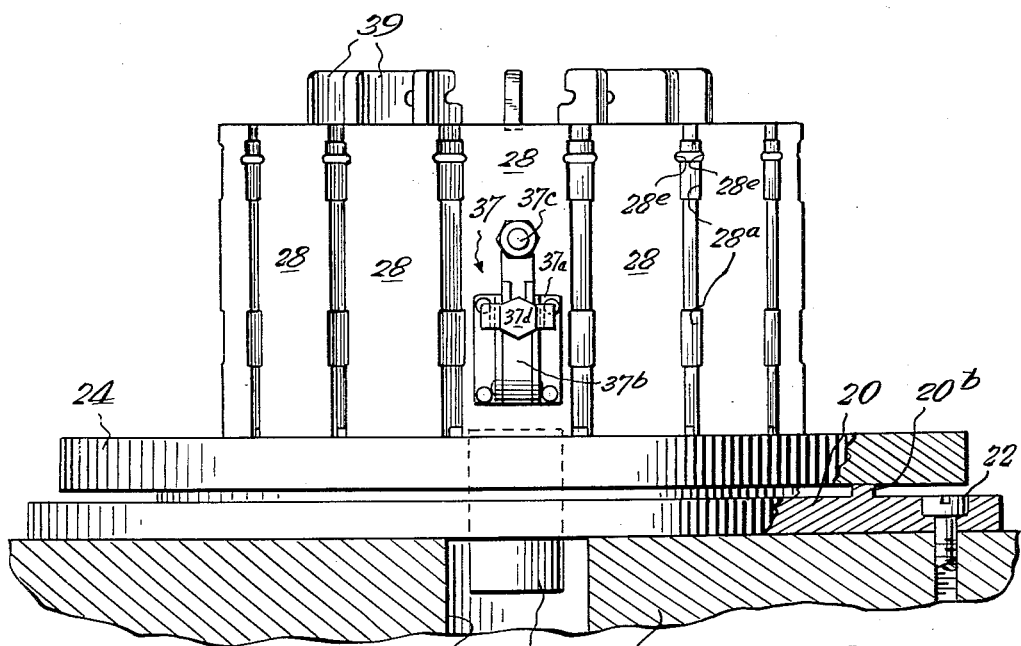
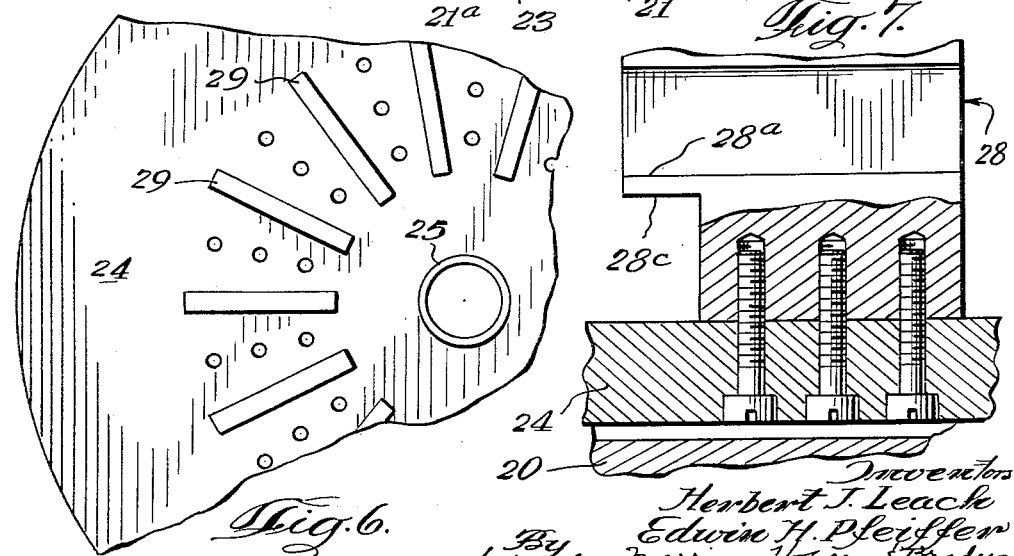

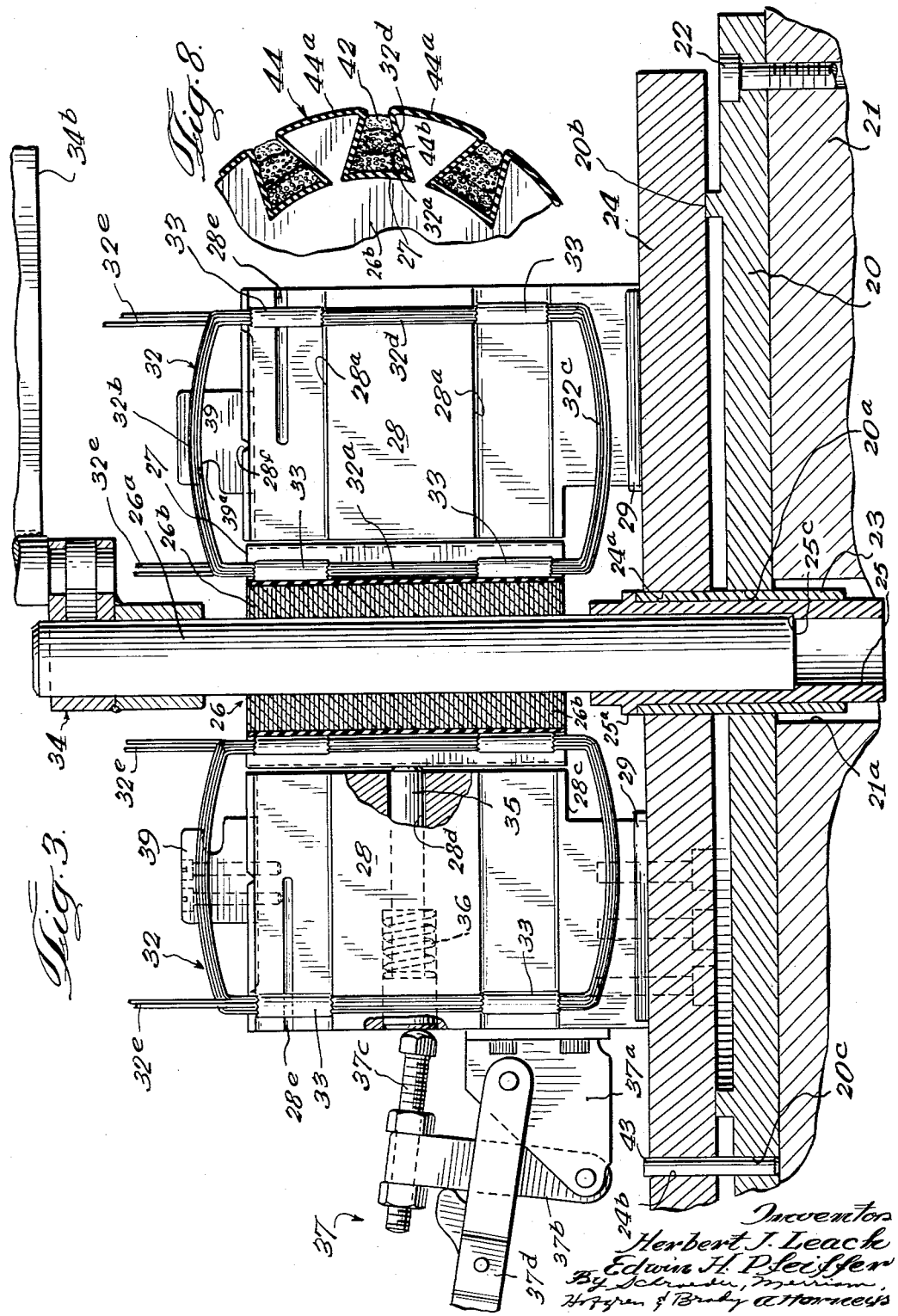

Aug. 8, 1961     H. J. LEACH ET AL     2,994,948
ARMATURE ASSEMBLY APPARATUS
Filed July 8, 1958     6 Sheets-Sheet 4
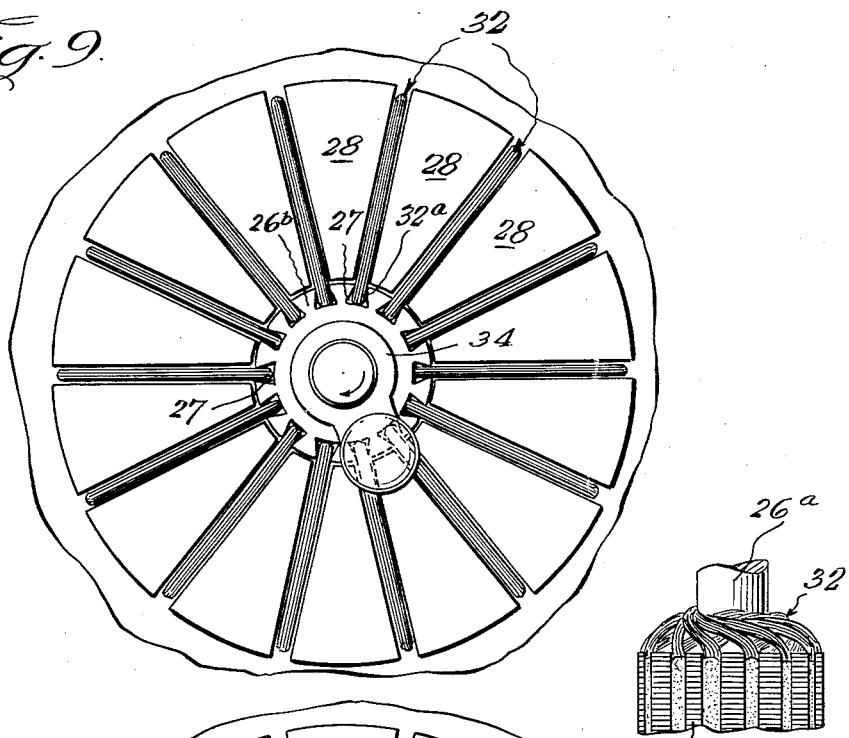
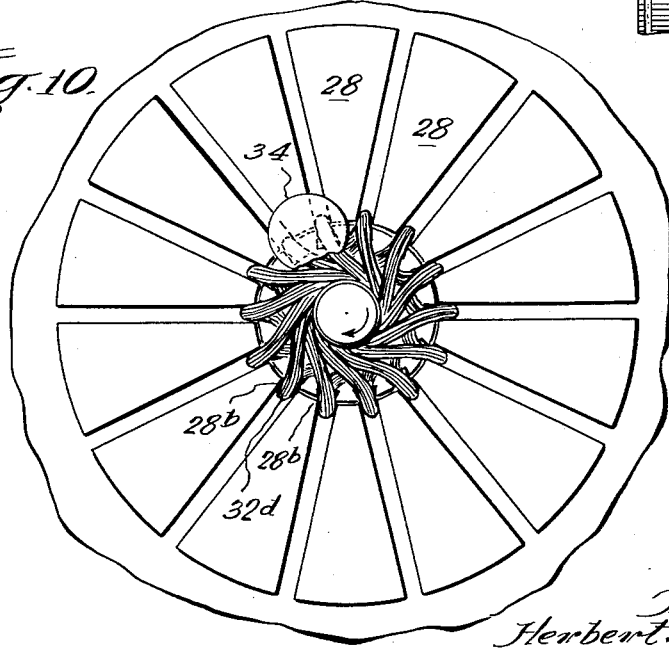
Inventors
Herbert J. Leach
Edwin H. Pfeiffer
By Schroeder, Merriam, Hofgren & Brady
Attorneys

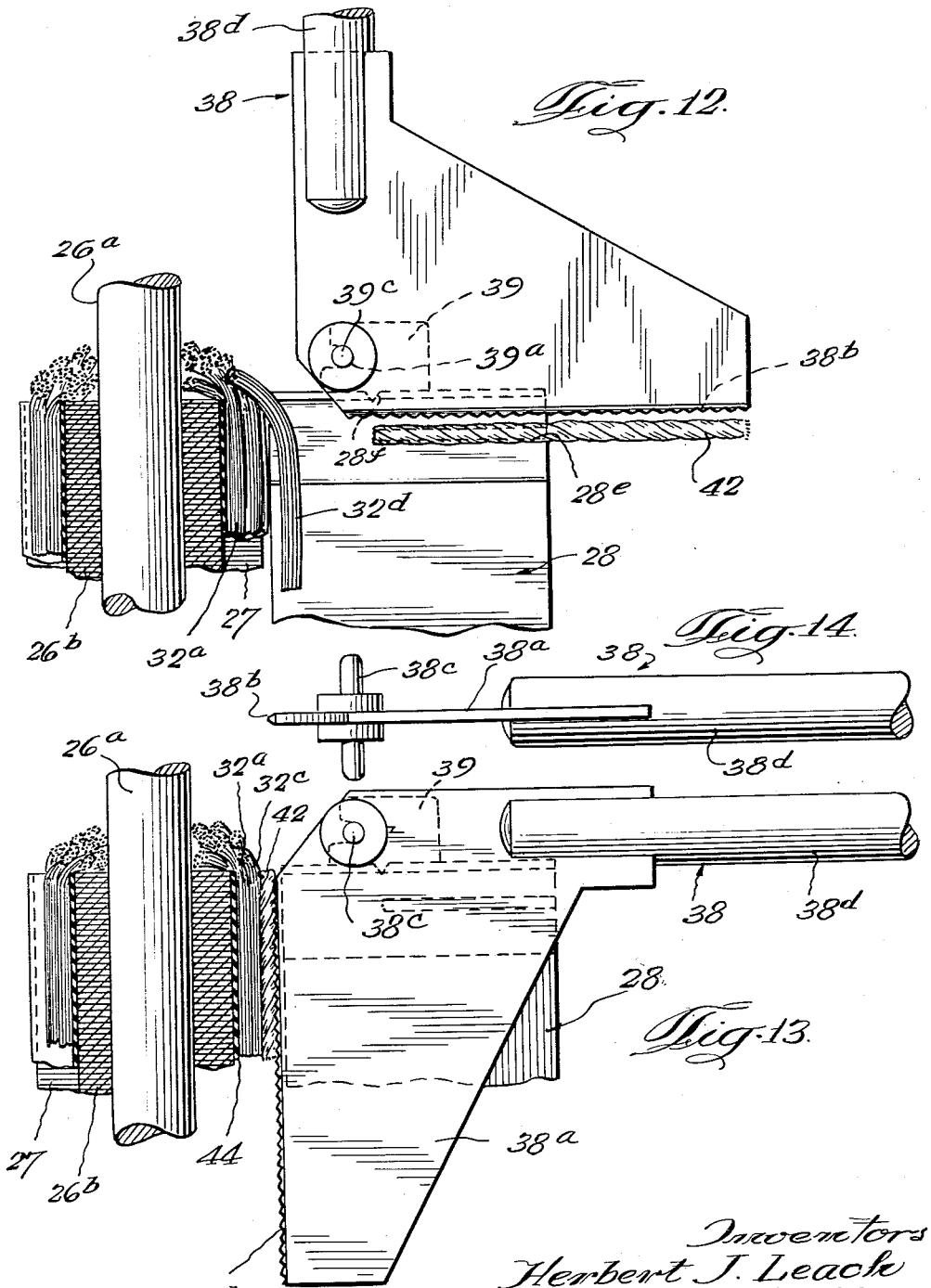

Aug. 8, 1961 H. J. LEACH ET AL 2,994,948
ARMATURE ASSEMBLY APPARATUS
Filed July 8, 1958 6 Sheets-Sheet 6
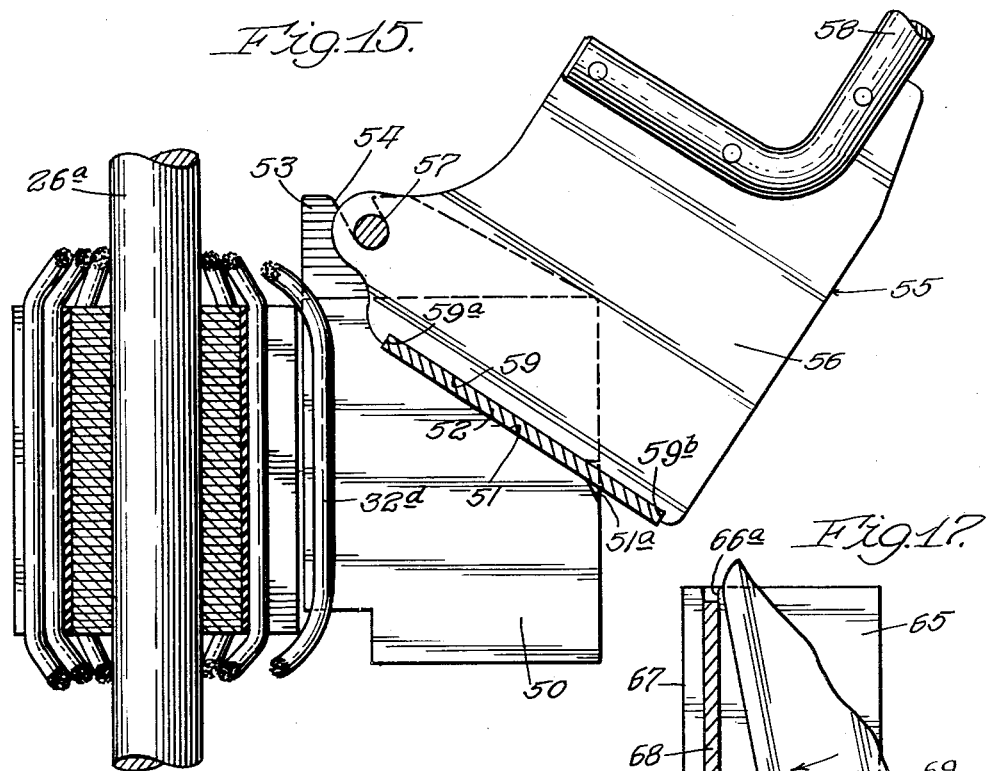
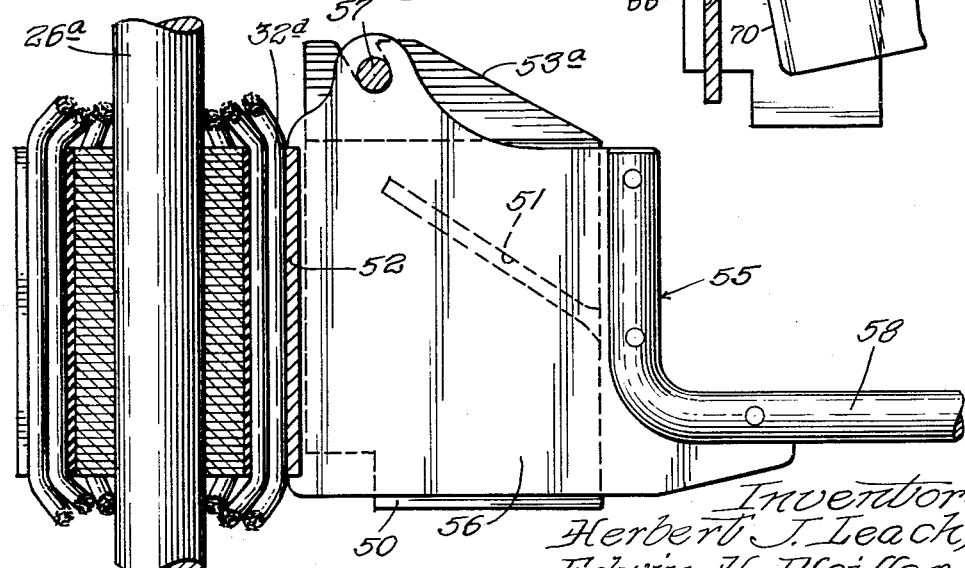
Inventors:
Herbert J. Leach,
Edwin H. Pfeiffer,
By Schroeder, Hofgren,
Brady, Wegner, Attys.

United States Patent Office 2,994,948
Patented Aug. 8, 1961

2,994,948
ARMATURE ASSEMBLY APPARATUS
Herbert J. Leach, Burlington, Wis., and Edwin H. Pfeiffer, Palos Heights, Ill. (Both of 850 N. Ogden, Chicago 22, Ill.), assignors to Samuel J. Shapiro, Lincolnwood, Ill.
Filed July 8, 1958, Ser. No. 752,153
13 Claims. (Cl. 29—205)

This invention relates to an armature assembly apparatus which is particularly adapted for assembling preformed armature coils on a slotted armature blank. This application is a continuation-in-part of Leach et al. application, Serial No. 381,802, filed September 23, 1953, now abandoned.

The apparatus disclosed and claimed herein are particularly adapted for, although not ilmited to, use in rewinding relatively small armatures such as those which are used in automotive generators or starting motors. At the present time when such rewinding is necessary, it is done by hand; a lengthy, expensive procedure which must be performed accurately in order that the armature operate properly. We have devised and disclose and claim herein a small, relatively inexpensive apparatus which utilizes preformed coils and eliminates much of the manual labor involved in assembling or rewinding armatures.

One feature of the invention is that it includes means for supporting a slotted armature blank in position to receive preformed coil means, and jig means associated with the supporting means and adapted to position the coil means operably with respect to the armature blank. A further feature is that the arrangement of the armature and the coil jig is such that each of the coils has a portion operably engageable with the armature, means are provided for effecting relative movement between the armature and the coil supporting or jig means bringing another portion of the coil means into engagement with the armature, and means are provided for bringing the remaining portion of the coil means into engagement with the armature.

Yet another feature is that the coil means themselves limit the relative movement between the armature and the coil supporting or jig means. A further feature is that a plurality of wedge-shaped jig segments are mounted in spaced relation about the periphery of the slotted armature blank there being a space between adjacent segments in register with each of the slots, with a coil being insertable between adjacent segments so that a portion thereof enters each of the slots, and means are provided for rotating the armature to wrap another portion of the coils about the armature, with a third portion of the coil engaging the jig segments and thus limiting the movement to a distance equal to the span of the coils, and means are provided for inserting the third portion of each of the coils in the appropriate slots.

Still another feature is the means for securing the last portion of each of the coils in a slot also effects insertion of the wedge means in the slots overlying and securing the coils in place. And a further feature is that adjacent jig segments are provided with cooperating grooves adapted to receive and properly position a coil wedge member. And another feature is that pusher means are engageable with bearing means associated with the jig segments and operable to effect insertion of the third portion of the coils and the coil wedge means.

A further feature is the method of assembling coil means on an armature which comprises inserting a portion of preformed coil means into slots on the armature, bringing another portion of the coil means into operative relation with the armature and securing a third portion of the coil means in the slots on the armature.

Further features and advantages will be readily apparent from the following specification and from the drawing, in which:

FIGURE 1 is a top plan view of a preferred embodiment of the invention, with a portion broken away;
FIGURE 2 is a side elevation view of the apparatus;
FIGURE 3 is a vertical section taken along line 3—3 of FIGURE 1;
FIGURE 4 is a perspective view of a wedge-shaped jig segment;
FIGURE 5 is a fragmentary elevation showing bearing means mounted on a jig segment;
FIGURE 6 is a fragmentary top plan view of the base member of the apparatus with the coil positioning jig means removed;
FIGURE 7 is a fragmentary elevation, partially in section illustrating the attachment of the jig segments to the base member;
FIGURE 8 is a fragmentary view showing a portion of a completed armature;
FIGURE 9 is a diagrammatic top plan view showing the apparatus in an intermediate condition during the assembly operation;
FIGURE 10 is a view similar to FIGURE 9 at another point in the operation;
FIGURE 11 is a fragmentary elevation showing a portion of a completed armature;
FIGURE 12 is a fragmentary elevation, partially in section showing the initial position of the pusher member;
FIGURE 13 is a view similar to FIGURE 12 showing the final position of the pusher member;
FIGURE 14 is a fragmentary top plan view of the pusher member;
FIGURE 15 is a view similar to FIGURE 12 showing a modified pusher and wedge holding arrangement;
FIGURE 16 is a view similar to FIGURE 13 of the modified structure of FIGURE 15; and
FIGURE 17 is a fragmentary view of a further modification of the wedge holding arrangement.

The preferred embodiment of the invention illustrated in the drawings operates generally in the following manner. A slotted armature blank, that is an armature shaft with slotted laminations suitably arranged thereon, is rotatably mounted in a generally upright position on a suitable working surface. Arranged peripherally about the armature blank are a series of wedge-shaped jig members which are spaced from each other to provide a plurality of intervening spaces there being one space for each of the slots of the armature. Preformed coils are then inserted between each pair of jig members with a portion of each coil extending into a slot on the armature; the coils at this point extend radially from the armature blank. The armature blank is then rotated, pulling the coils along with it and wrapping another portion of each of them about the armature blank. After the armature has been rotated an angular distance equal to the span of the coils, a third portion of each coil engages the inner edge of the respective jig members preventing further movement; the third portion of each of the coils is now positioned adjacent another of the slots of the armature blank.

The operator may now lock the armature in place and complete the assembly operation inserting the third portion of each of the coils in respective slots. This is preferably accomplished by means of a pusher bar which is pivotally engageable on top of each of the jig segments, use of the pusher member both effecting insertion of the third portion of the coils and also forcing coil wedges into the slots overlying and securing the coils.

Referring now more particularly to the drawings, a bottom plate 20 is secured to a work-suspporting surface 21, such as a bench top, by bolts 22. A bushing 23 is tightly fitted into opening 20a in the center of the bottom plate and extends outwardly on either side thereof, an opening 21a being provided in the bench top 21 to receive it. Base plate 24 is similarly provided with a central opening 24a which has a loose fit with bushing 23, the base plate being pivotable about the bushing as an axle. A rib 20b extends upwardly from the surface of bottom plate 20 inwardly from the outer periphery of base plate 24, supporting the base plate in generally spaced relationship with the bottom plate, reducing friction therebetween to facilitate rotation of the base plate. A sleeve 25 fits inside bushing 23 and has a flange portion 25a which engages the top of the bushing preventing the sleeve from falling through. A shoulder 25c is provided on the inner bore of sleeve 25 and is adapted to support the armature blank indicated generally as 26. Sleeves of various lengths may be provided to accommodate armatures with shafts of various lengths.

The armature blank 26 includes an armature shaft 26a which extends into and engages the shoulder 25c of sleeve 25, and has laminations 26b mounted thereon. A plurality of longitudinally extending slots 27, fourteen being shown here, are suitably provided in the armature laminations.

The coil jig means includes a plurality of wedge-shaped jig members 28 arranged peripherally on base plate 24 about the central opening 24a therein. The inner diameter of the jig means is slightly greater than the outer diameter of the armature laminations as shown in FIGURE 3 in order that the armature may readily be inserted in and removed from the apparatus. Adjacent jig members 28 are spaced from each other and the number of jig members is such that the number of intermediate spaces is equal to the number of longitudinal slots 27 in the armature. Spacing plates 29 are interposed between each pair of wedge-shaped jig members 28.

The coil elements 32 are composed of the desired number of turns of wire formed into a generally rectangular arrangement. Sleeves 33 are wrapped about the sides of coils 32 preventing them from coming apart during handling. These coils may be prepared by any suitable means, as an automatic coil winding machine.

The space between each adjacent pair of jig members is sufficient to receive a generally rectangular preformed coil element 32, as shown in FIGURES 3 and 9. The spacing between adjacent jig segments 28 is designed so that coils s32 fit tightly therein; channels 28a being provided in the sides of the segments to permit passage of the sleeves 33. A portion 32a of each of coil elements 32 extends on into one of the slots 27 in the armature while the remainder of the coil is supported by the jig members 28. The insertion of coils 32 between jig segments 28 with a portion thereof engaging armature slots 27 completes the first portion of the assembly operation.

The next step in the assembly procedure is to effect relative movement between the coil jig and the armature blank, wrapping the tops and bottoms 32b and 32c of coils 32 about the armature blank as shown in FIGURE 10. A gripping fixture 34 is applied to the upper end of the armature shaft 26a and is provided with an elongated handle 34b through which sufficient force may be exerted on the armature to cause it to turn. After the armature has been rotated through an angular distance equal to the span of the coils, a third or outer portion 32d of the coils engages the inner edge 28b of the jig segments preventing further movement. The slots 27 in the armature blank are again positioned adjacent the spaces between the jig members 28, or stated in a different manner a third portion 32d of each of the coils is positioned adjacent a slot in the armature, exactly one coil span removed from the slot in which the first portion 32a of each coil was inserted. This completes the second portion of the assembly operation.

The lower inner corner of each of jig segments 28 is cut away at 28c to accommodate the bottom portions 32c of each coil and to permit the portion 32d to operably engage the lower edge 28b of the jig members limiting rotation of the armature blank as described above.

It is desirable to lock the armature blank in position after it has been rotated as described above, in order to facilitate the proper insertion of the remaining portion 32d of the coils into their respective slots 27. Three of the jig members, 28, are provided with an opening 28d therethrough adapted to receive a locking pin 35 slidably movable therein. Spring 36 normally biases pins 35 away from armature 26. An adjustable toggle arrangement, indicated generally as 37, is provided for driving the locking pins firmly against the sides of the armature holding it in position. In the toggle mechanism, a bracket 37a is affixed to the outer surface of jig segment 28 and is provided with a link 37b pivotally connected at the lower edge thereof and having an operating portion 37c which engages locking pin 35. Operating arm 37d is also pivoted on bracket 37a and may be moved upwardly engaging link 37b causing it to force pin 35 tightly against the armature.

Referring now to FIGURES 12 and 13, the operation of pusher member 38 is inserting the remaining portion 32d of the coils into the slots 27 will be described. A bearing member 39 having a U-shaped bearing portion 39a is secured to the top of each of the jig segments 28 (FIG. 5). The pusher member 38 includes a pusher plate 38a which has a serrated or toothed edge 38b, a pivot pin 38c at the upper edge thereof and an operating handle 38d. The pivot pin 38c may be engaged with the bearing surface 39a of member 39 and the pusher rotated downwardly, the edge 38b thereof engaging portion 32d of the coil and forcing it into slot 27. In many situations, it is desirable to insert a coil wedge member 42, of a suitable material, in slots 27 and overlying the outer coil portion 32d. The coil wedge may be inserted by the pusher bar in the same operation which effects insertion of coil portion 32d. In order to facilitate the insertion of the wedge members 42, each pair of adjacent jig segments 28 are provided, near the top thereof, with cooperating grooves 28e which receive and preliminarily position the wedge members; a notch or mark 28f on the top jig segments 28 provides a guide for the inner end of wedge member 42, assuring proper positioning thereof.

As shown in FIGURE 12, the pusher member 38 is originally positioned with its forward edge 38b in a substantially horizontal position adjacent to and slightly above coil retaining member 42. As the pusher member is rotated it engages coil retaining member 42 and carries it along until the coil retainer engages portion 32d of the coil. Further movement of the pusher member drives portion 32d of the coil and coil retainer 42 on into slot 27, wedging the coil and coil retainer securely in place.

After this operation has been carried out for each of the coils the toggle means 37 may be released unlocking the armature permitting its removal from the jig apparatus. The armature is now ready for further processing such as the attachment of slip rings, commutator bars or the like to the free ends 32e of the coils.

In order to facilitate insertion of the preformed coils and use of the pusher means 38 on all sides of the apparatus, the base plate 24 is made rotatable on bottom plate 20. It is necessary, however, during the rotation of the armature 26 pulling the coils 32 around it, that the coil jig be stationary, for this reason base plate 24 is provided with an opening 24b near the edge thereof through which locking pin 43 may be inserted extending into cooperating opening 20c.

To prevent rupturing the insulation on the wires of the coils 32 it is desirable to initially wrap the armature 26 with a material such as a heavy paper 44, this paper being shaped to fit into the slots 27 as shown in FIGURE 8; the paper covering prevents the sharp edges of slots 27 from injuring the insulation. After the coils 32 have been assembled on the armature the portions of this covering 44a on the peripheral surface of the armature may be removed, the portions 44b which line the slots 27 being left in place.

Turning now to FIGURES 15 and 16, a modified construction of the assembly apparatus is illustrated. The jig segment 50 is provided with a wedge receiving groove 51 which extends upwardly and inwardly of the jig segment from about the center of the outer surface thereof. The outer end 51a of the groove is flared or opened to facilitate the insertion of wedge 52. The bearing member 53, located on the top of jig segment 50, has a bearing slot 54 which opens upwardly, facilitating the insertion of the pivot for the pusher member. The outer surface 53a of bearing 53 is inclined upwardly, permitting the operator to rest the pusher pivot on the surface and slide it upwardly until it drops into bearing slot 54.

The pusher member 55 has a blade portion 56 with pivot 57 at the upper portion thereof. The handle 58 secured to blade 56 extends outwardly from a lower portion thereof, opposite the pivot 57. This places the end of the handle in a position for easier manipulation by the operator. The forward edge 59 of the pusher blade 56 is smooth, rather than serrated, and is provided with shoulders 59a and 59b at either end thereof which operate to position the wedge 52 properly as it is picked up from groove 51 during movement of the pusher member. As in the above described embodiment of the invention, the single operation of the pusher member forces coil portion 32d into the armature slot and seats wedge 52 in the slot opening, as shown in FIGURE 16.

A further modification of the invention is shown in FIGURE 17, where a jig segment 65 is illustrated having a wedge receiving channel 66 extending vertically therein, and positioned adjacent the inner surface 67 of the jig segment, so that the wedge is located close to and in alignment with the slot in the transformer being wound. The upper end of the wedge channel is flared at 66a to facilitate insertion of the wedges, which may merely be dropped into the channel, as by an automatic loading machine. As the wedge 68 is properly aligned with the associated armature slot, and immediately adjacent thereto, pusher 69 has a smooth edge 70, without need for serrations or shoulders or the like to insure proper positioning of the wedge during insertion.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. Armature assembly apparatus of the character described, comprising: means for supporting a slotted armature blank; a plurality of spaced wedge-shaped jig segments fixedly mounted peripherally about said armature blank supporting means for supporting preformed coils, having top, bottom and first and second side portions, with a first side portion of each of said coils inserted in a slot in said armature blank; means for effecting relative rotational movement between said armature blank and said jig segments to wrap the top and bottom portions of said coils about said armature blank; bearing means operably associated with said jig segments; and means engageable with said bearing means and movable into the spaces between the jig segments to effect insertion of the second side portion of a coil into a slot in said armature blank.

2. Armature assembly apparatus of the character described, comprising: means for supporting a slotted armature blank; a plurality of spaced wedge-shaped jig segments arranged peripherally about said armature blank supporting means for supporting preformed coils, having top, bottom and first and second side portions, with the first side portion of each of said coils inserted in a slot in said armature blank; means for effecting relative rotational movement between said armature blank and said jig segments to wrap the top and bottom portions of said coils about said armature blank; a plurality of bearing members, one mounted on each of said jig segments; and a pusher member engageable with said bearing members and pivotally operable to move into the space between adjacent jig segments effect insertion of the second side portion of a coil into a slot in said armature.

3. Armature assembly apparatus of the character described in claim 2, wherein adjacent jig segments are provided with cooperating grooves adapted to receive a coil wedge member and operation of said pusher member effects insertion of said wedge member into the armature slot overlying said second side portion of said coil.

4. Armature assembly apparatus of the character described in claim 2, wherein said pusher member has a serrated operating surface.

5. Armature assembly apparatus of the character described in claim 2, in which said pusher member has a handle extending outwardly from a portion of the pusher spaced from the bearing engaging portion thereof.

6. Armature assembly apparatus of the character described for assembling a plurality of preformed coils on an armature blank having a plurality of longitudinal slots therein, comprising: a base member; means for rotatably mounting said armature blank with the lower end thereof spaced above said base member; a plurality of wedge-shaped jig segments fixedly mounted on said base member about said armature blank supporting means, each segment having an inner portion adjacent said armature blank, there being a space between adjacent jig segments in register with each of the slots in said armature blank to support a preformed coil having top, bottom and first and second side portions, positioned between adjacent segments with the first side portion of each coil extending into the registered slot in said armature blank, the lower inner portion of said jig segments being cut away, the top of each coil being above the top of the jig segments and the bottom of each coil being below the bottom of the jig segments at the cut away portion; means for rotating said armature blank throughout an angle equal to the span of said coils to draw the second side portion of each coil into locking engagement with the inner portion of an adjacent jig segment, thereby limiting rotation of the armature blank; means for locking said armature in rotated position; bearing means operatively associated with said jig segments; and means engageable with said bearing means movable into the spaces between the jig segments to effect insertion of the second side portion of the coils into the adjacent slots in the armature blank.

7. Armature assembly apparatus of the character described, comprising: means for supporting a slotted armature blank; a plurality of spaced wedge-shaped jig segments fixedly mounted peripherally about said armature blank supporting means for supporting preformed coils having top, bottom and first and second side portions, with a first side portion of each of said coils inserted in a slot in said armature blank; means for effecting relative rotational movement between said armature blank and said jig segments to wrap the top and bottom portions of said coils about said armature blank; bearing means operably associated with said jig segments; and means engageable with said bearing means and movable into the spaces between the jig segments to effect insertion of the second side portion of a coil into a slot in said armature blank, adjacent jig segments being provided with cooperating grooves extending inwardly and upwardly from the outer surface thereof to receive a coil wedge member, the movement of said bearing engageable means into the spaces between the jig segments effecting movement of said wedge member from said grooves into the armature slot overlying the second side portion of said coil.

8. Armature assembly apparatus of the character described, comprising: means for supporting a slotted armature blank; a plurality of spaced wedge-shaped jig segments fixedly mounted peripherally about said armature blank supporting means for supporting preformed coils having top, bottom and first and second side portions, with a first side portion of each of said coils inserted in a slot in said armature blank; means for effecting relative rotational movement between said armature and said jig means to wrap the top and bottom portions of said coils about said armature; bearing means operably associated with said jig segments; and means engageable with said bearing means and movable into the spaces between the jig segments to effect insertion of the second side portion of a coil into a slot in said armature, adjacent jig segments being provided with cooperating grooves extending downwardly from the top of said jig segments and adjacent the inner surface thereof to receive a coil wedge member and station it for engagement by said bearing engageable means, movement of said bearing engageable means into the spaces between the jig segments effecting insertion of said wedge member into the armature slot overlying the second side portion of said coil.

9. Armature assembly apparatus of the character described, comprising: means for supporting a slotted armature blank; a plurality of spaced wedge-shaped jig segments fixedly mounted peripherally about said armature blank supporting means for supporting preformed coils having top, bottom and first and second side portions, with a first side portion of each of said coils inserted in a slot in said armature blank; means for effecting relative rotational movement between said armature and said jig means to wrap the top and bottom portions of said coils about said armature; bearing means operably associated with said jig segments; means engageable with said bearing means and movable into the space between adjacent jig segments to effect insertion of the second side portion of a coil into the slot in said armature adjacent said space, said bearing engageable means being shiftable from each space to another space to effect insertion of the second side portion of all coils, and cooperating grooves provided in adjacent jig segments, and having a flared outer end to receive a coil wedge member, the member of said bearing engageable means into the spaces between the jig segments effecting insertion of the wedge member into the armature slot overlying the second side portion of said coil; and means rotatably mounting said armature blank supporting means to facilitate the shifting of said bearing engageable means.

10. Armature assembly apparatus of the character described, comprising: means for supporting a slotted armature blank; a plurality of spaced wedge-shaped jig segments arranged peripherally about said armature blank supporting means for supporting preformed coils, having top, bottom and first and second side portions, with the first side portion of each of said coils inserted in a slot in said armature blank; means for effecting relative rotational movement between said armature and said jig segments to wrap the top and bottom portions of said coils about said armature; a plurality of bearing members, one mounted on each of said jig segments; and a pusher member engageable with said bearing members and pivotally operable to move into the space between adjacent jig segments to effect insertion of the second side portion of a coil into the slot in said armature, adjacent jig segments being provided with cooperating grooves adapted to receive a coil wedge member, whereby the operation of said pusher member effects the insertion of said wedge member into the armature slot overlying said second side portion of said coil, said pusher member having a smooth operating surface with a shoulder at an end thereof serving as a stop to hold said wedge in place on said operating surface when pivotally engaged by said pusher member.

11. Armature assembly apparatus of the character described in claim 10, wherein said pusher member has shoulders at both ends of said smooth operating surface.

12. Armature assembly apparatus of the character described, comprising: means for supporting a slotted armature blank; a plurality of spaced wedge-shaped jig segments fixedly mounted peripherally about said armature blank supporting means for supporting preformed coils, having top, bottom and first and second side portions, with the first side portion of each of said coils inserted in a slot in said armature blank; means for effecting relative rotational movement between said armature blank and said jig segments to wrap the top and bottom portions of said coils about said armature blank; bearing means on the top of said jig segments and having bearing slots opening through the upper surface thereof; and means engageable with said bearing means to pivot about said bearing slots and pivotally movable into the spaces between the jig segments to effect insertion of the second side portion of a coil into a slot in said armature, said bearing engageable means being shiftable among said slots to operate in consecutive spaces between said jig segments.

13. Armature assembly apparatus of the character described in claim 12, in which said bearing means include an inclined surface leading to said bearing slot.

References Cited in the file of this patent

UNITED STATES PATENTS

| | | |
|---|---|---|
| 1,964,441 | Phelps | June 26, 1934 |
| 2,703,923 | Caldwell | Mar. 15, 1955 |